(12) United States Patent
Wu

(10) Patent No.: US 6,901,829 B2
(45) Date of Patent: Jun. 7, 2005

(54) TURRET LATHE WITH A CLUTCH FOR OPERATING BETWEEN CHAMFERING AND TURNING OPERATION MODES

(76) Inventor: Hsuan-Lung Wu, No. 4-6, Le-Tien Lane, Feng-Shu Li, Nan-Tun Dist., Taichung City (TW)

( * ) Notice: Subject to any disclaimer, the term of this patent is extended or adjusted under 35 U.S.C. 154(b) by 117 days.

(21) Appl. No.: 10/642,421

(22) Filed: Aug. 15, 2003

(65) Prior Publication Data

US 2005/0034575 A1 Feb. 17, 2005

(51) Int. Cl.[7] ............................................. B23B 3/00
(52) U.S. Cl. ............................ 82/121; 82/119; 82/120; 82/140; 82/148; 82/159
(58) Field of Search .......................... 82/119, 120, 121, 82/140, 148, 159; 29/35.5, 40, 36, 50

(56) References Cited

U.S. PATENT DOCUMENTS 3,725,987 A * 4/1973 Kurimoto et al. ........... 29/27 C
5,673,467 A * 10/1997 Miyano et al. ............. 29/27 C
5,787,560 A * 8/1998 Schalles ........................ 29/36

* cited by examiner

Primary Examiner—Willmon Fridie, Jr.
(74) Attorney, Agent, or Firm—Jonathan Alan Quine; Quine Intellectual Property Law Group, P.C.

(57) ABSTRACT

A turret lathe includes a bed, a headstock mounted on the bed, a first slide mounted slidably on the bed, a second slide mounted slidably on the first slide, a spindle journalled to the headstock, a chuck mounted on the spindle, a tailstock mounted on the second slide, a driven shaft journalled to the tailstock, a turret mounted on the driven shaft, a transmission unit, and a clutch operable between a chamfering operation mode, in which the driven shaft is connected to the spindle through the transmission unit, and a turning operation mode, in which the driven shaft is disconnected from the spindle.

4 Claims, 10 Drawing Sheets

TURRET LATHE WITH A CLUTCH FOR OPERATING BETWEEN CHAMFERING AND TURNING OPERATION MODES

BACKGROUND OF THE INVENTION

1. Field of the Invention

This invention relates to a turret lathe, more particularly to a turret lathe with a clutch for operating between chamfering and turning operation modes.

2. Description of the Related Art

FIG. 1 illustrates a conventional turret lathe that includes a bed 11, a headstock 12 mounted on the bed 11, a driving unit (not shown) mounted on the bed 11, a spindle journalled to the headstock 12 and driven by the driving unit, a chuck 14 mounted on the spindle and adapted to hold a workpiece (not shown), a saddle 13 mounted on the bed 11, a first slide 15 mounted slidably on the saddle 13 and slidable in a longitudinal direction toward the chuck 14, a second slide 16 mounted on the first slide 15 and slidable in a transverse direction relative to the longitudinal direction, a turning seat 17 mounted on one end of the second slide 16 and opposite to the headstock 12, a turret 18 mounted securely on the turning seat 17, a turning tool (not shown) mounted on the turret 18 for turning the workpiece, a chamfering seat 19 mounted on the other end of the second slide 16, a driven shaft (not shown) journalled to the chamfering seat 19, a chamfer tool 102 mounted on the driven shaft so as to co-rotate therewith for chamfering the workpiece, a transmission unit 10 connected to the driven shaft, and a clutch 101 that is operable between a chamfering operation mode, in which the clutch 101 connects the transmission unit 10 to the driving unit, thereby permitting co-rotation of the spindle and the driven shaft during a chamfering opeation, i.e., co-rotation of the chamfer tool 102 and the workpiece, and a turning operation mode, in which the clutch 101 disconnects the transmission unit 10 from the driving unit, thereby avoiding co-rotation of the spindle and the driven shaft during a turning operation. In the chamfering operation, the chamfer tool 102 is moved toward the workpiece by sliding the first slide 15 in the longitudinal direction and the second slide 16 in the transverse direction toward the workpiece, and the clutch 101 is adjusted to the chamfering operation mode to permit co-rotation of the chamfer tool 102 and the workpiece. In the turning operation, the turning tool is moved toward the workpiece in a manner similar to that of the chamfer tool 102, and the clutch 101 is adjusted to the turning operation mode to avoid rotation of the driven shaft when the workpiece rotates.

The conventional turret lathe is disadvantageous in that a turning seat 17 and a chamfering seat 19 are required for mounting of the turning tool and the chamfering tool 102, respectively, which complicates the structure of the conventional turret lathe and which increases the manufacturing cost.

SUMMARY OF THE INVENTION

The object of the present invention is to provide a turret lathe that is capable of overcoming the aforesaid drawbacks of the prior art.

According to the present invention, a turret lathe comprises: a bed having two opposite ends; a headstock mounted on one of the opposite ends of the bed; a driving unit mounted on the bed; a spindle journalled to the headstock and driven by the driving unit to rotate about a rotation axis; a chuck mounted on the spindle; a first slide mounted slidably on the other of the opposite ends of the bed and slidable toward and away from the chuck in a longitudinal direction parallel to the rotation axis; a second slide mounted slidably on the first slide and slidable toward and away from the rotation axis in a transverse direction relative to the longitudinal direction; a tailstock mounted on the second slide; a driven shaft journalled to the tailstock; a turret mounted on the driven shaft so as to co-rotate therewith, disposed between the chuck and the tailstock, and adapted to permit mounting of a plurality of tools thereon; a transmission unit associated with the spindle and the driven shaft; and a clutch that is associated with the transmission unit and the spindle and that is operable between a chamfering operation mode, in which the transmission unit interconnects the spindle and the driven shaft through the clutch, thereby permitting co-rotation of the spindle and the driven shaft, and a turning operation mode, in which the spindle is disconnected from the driven shaft, thereby avoiding rotation of the driven shaft when the spindle rotates.

BRIEF DESCRIPTION OF THE DRAWINGS

In drawings which illustrate an embodiment of the invention.

DETAILED DESCRIPTION OF THE PREFERRED EMBODIMENTS

Figure 1:
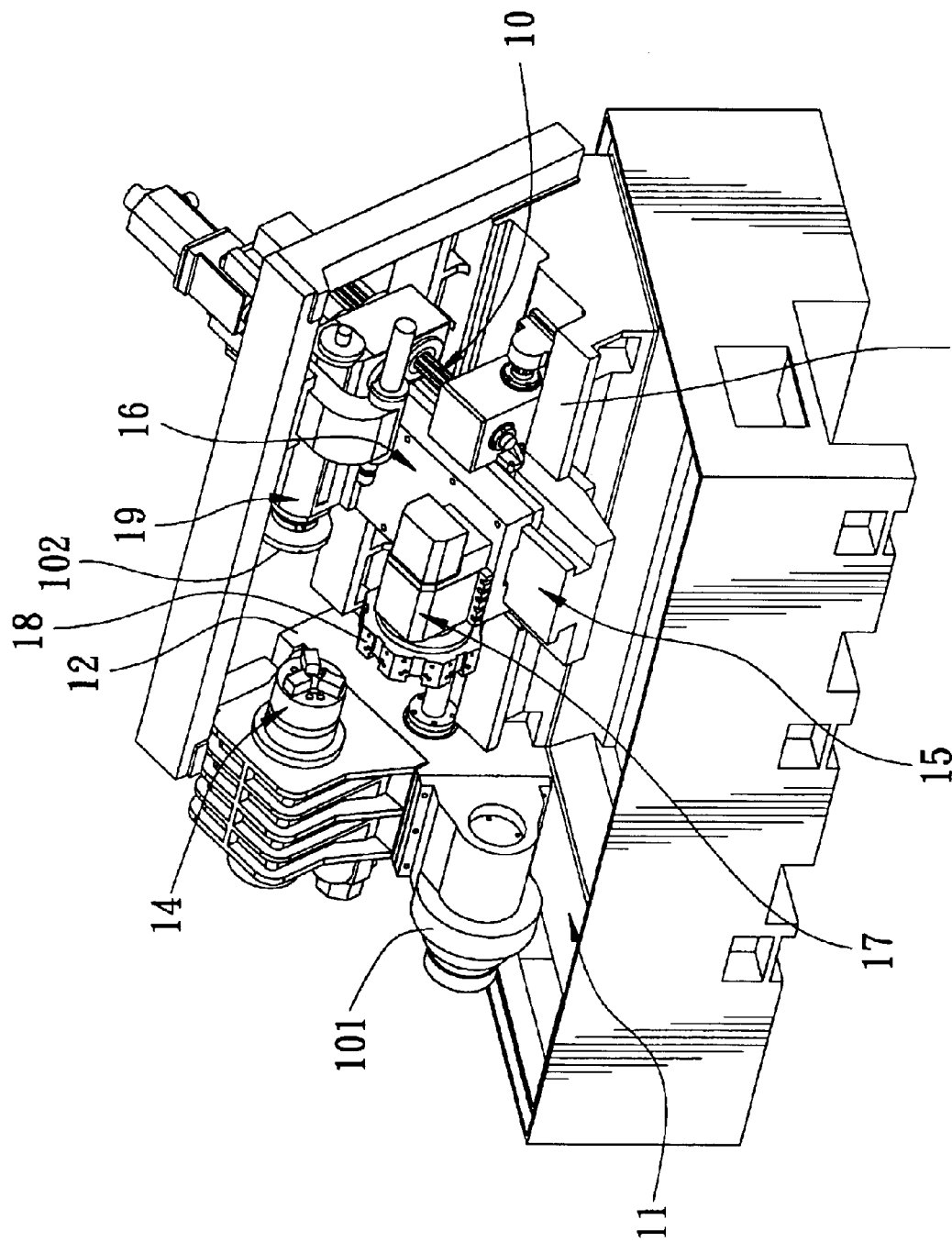
FIG. 1 is a perspective view of a conventional turret lathe.

FIGS. 2 to 6 illustrate a preferred embodiment of a turret lathe of this invention for machining a workpiece (not shown).

The turret lathe includes: a bed 2 having two opposite ends; a headstock 31 mounted on one of the opposite ends of the bed 2; a driving unit 20 (see FIG. 4) mounted on the bed 2; a spindle 32 journalled to the headstock 31 and driven by the driving unit 20 to rotate about a rotation axis; a chuck 33 mounted on the spindle 32; a first slide 41 mounted slidably on the other of the-opposite ends of the bed 2 and driven by a motor 411 to slide toward and away from the chuck 33 in a longitudinal direction (X) parallel to the rotation axis; a second slide 40 mounted slidably on the first slide 41 and driven by a motor 421 to slide toward and away from the rotation axis in a transverse direction (Y) relative to the longitudinal direction (X); a tailstock 42 mounted on the second slide 40; a driven shaft 43 journalled to the tailstock 42; a turret 431 mounted on the driven shaft 43 so as to co-rotate therewith, disposed between the chuck 33 and the tailstock 42, and adapted to permit mounting of a plurality of turning tools 200 and chamfer tools 210 thereon; a transmission unit 60 associated with the spindle 32 and the driven shaft 43; and a clutch 50 that is associated with the transmission unit 60 and the spindle 32 and that is operable between a chamfering operation mode, in which the transmission unit 60 interconnects the spindle 32 and the driven shaft 43 through the clutch 50, thereby permitting co-rotation of the spindle 32 and the driven shaft 43, and a turning operation mode, in which the spindle 32 is disconnected from the driven shaft 43, thereby avoiding rotation of the driven shaft 43 when the spindle 32 rotates.

Figure 5:
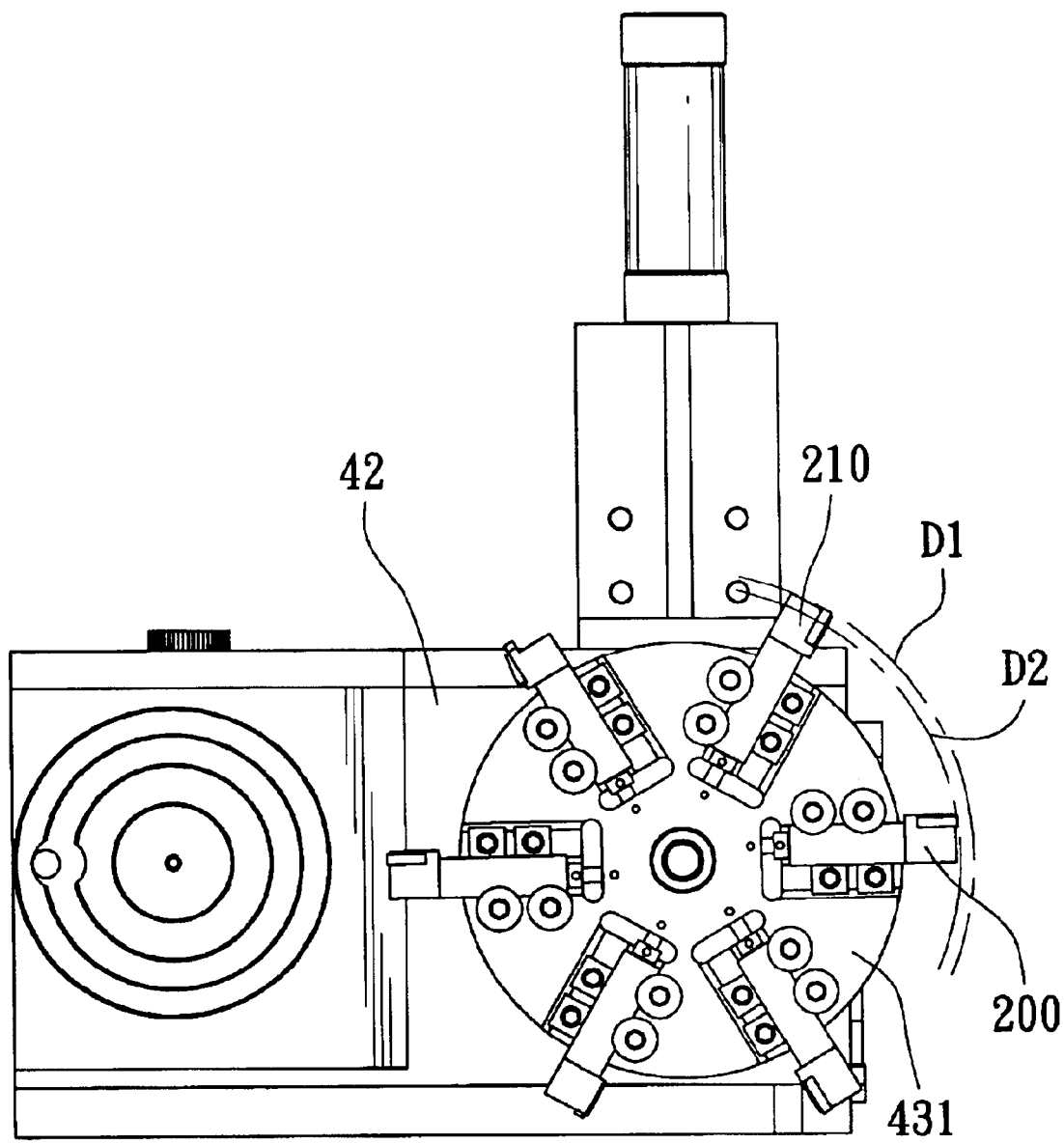
FIG. 5 is a fragmentary side view to illustrate the configuration of a turret of the turret lathe of FIG. 2.
Figure 6:
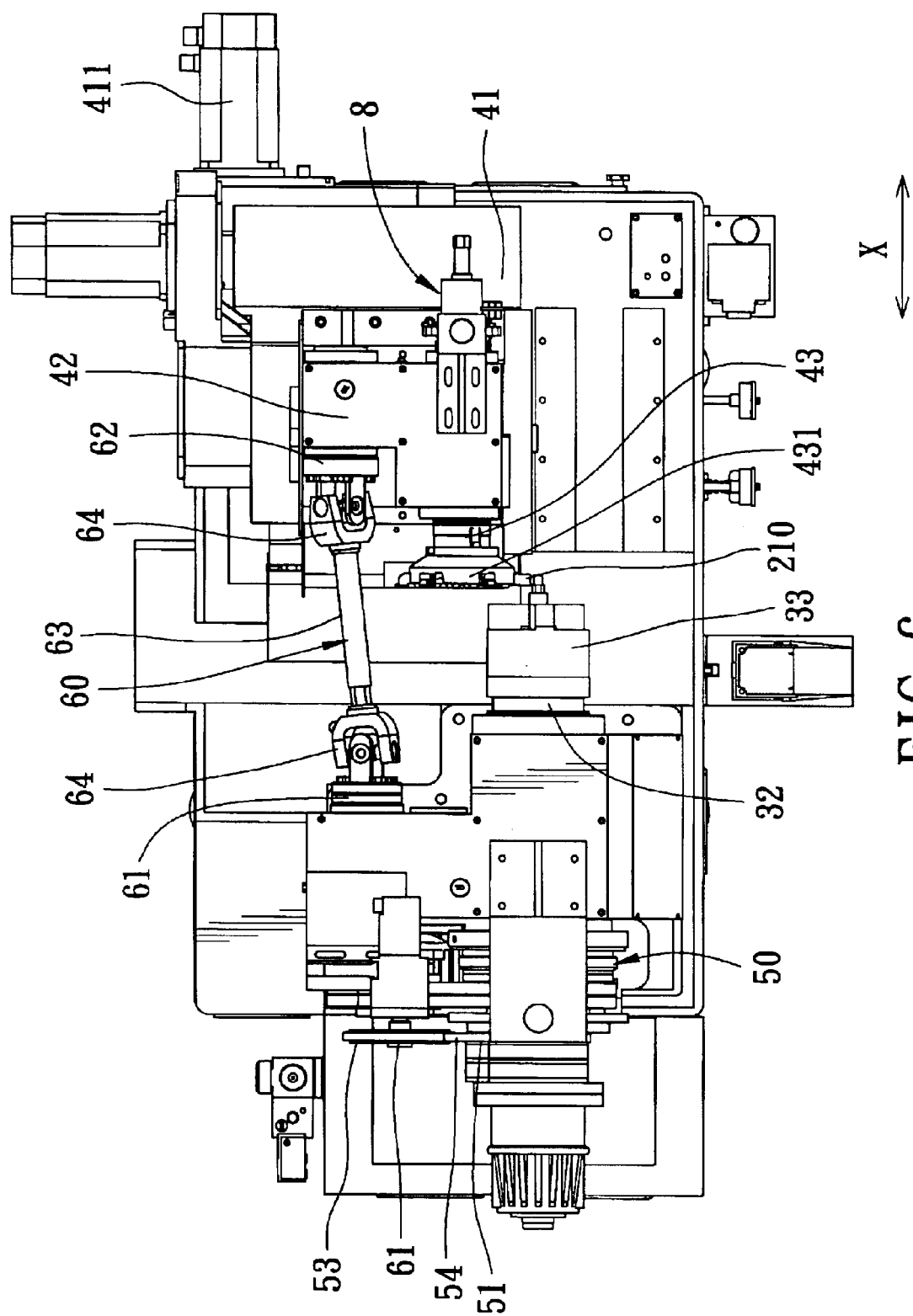
FIG. 6 is a top view of the turret lathe of FIG. 2.

Referring to FIG. 5, the chamfer tools 210 and the turning tools 200 are angularly spaced apart from each other, and are alternately disposed on the turret 431. Each of the chamfer tools 210 and the turning tools 200 has a cutting edge that extends radially relative to the turret 431 and that has a distal end distal from a center of the turret 431. The distal end of the cutting edge of each of the chamfer tools 210 moves along a chamfer circle during the chamfering operation. The distal end of the cutting edge of each of the turning tools 200 moves along a turning circle during the chamfering operation. The chamfer circle has a diameter ($D_1$) greater than the diameter ($D_2$) of the turning circle so that only the chamfer tools 210 can contact the workpiece during the chamfering operation. Note that only a selected one of the turning tools 200 contacts the workpiece during the turning operation.

The transmission unit 60 includes a first pulley 51 (see FIG. 3) that is associated with the clutch 50, an input shaft 61 (see FIG. 6) that is journalled to the headstock 31 and that is parallel to the rotation axis, a second pulley 53 (see FIG. 4) that is co-axially mounted on the input shaft 61, a belt 54 that is trained on the first and second pulleys 51, 53, first and second universal joints 64, an output shaft 62 that is journalled to the tailstock 42, that is parallel to the rotation axis, and that is connected to the driven shaft 43, and a telescopic connecting member 63 that is disposed between and that interconnects the input and output shafts 61, 62 through the first and second universal joints 64 and that is telescopically extendable in the longitudinal direction (X). The first pulley 51 is connected to the spindle 32 through the clutch 50 when the clutch 50 is operated at the chamfering operation mode, and is disconnected from the spindle 32 when the clutch 50 is operated at the turning operation mode.

Figure 2:
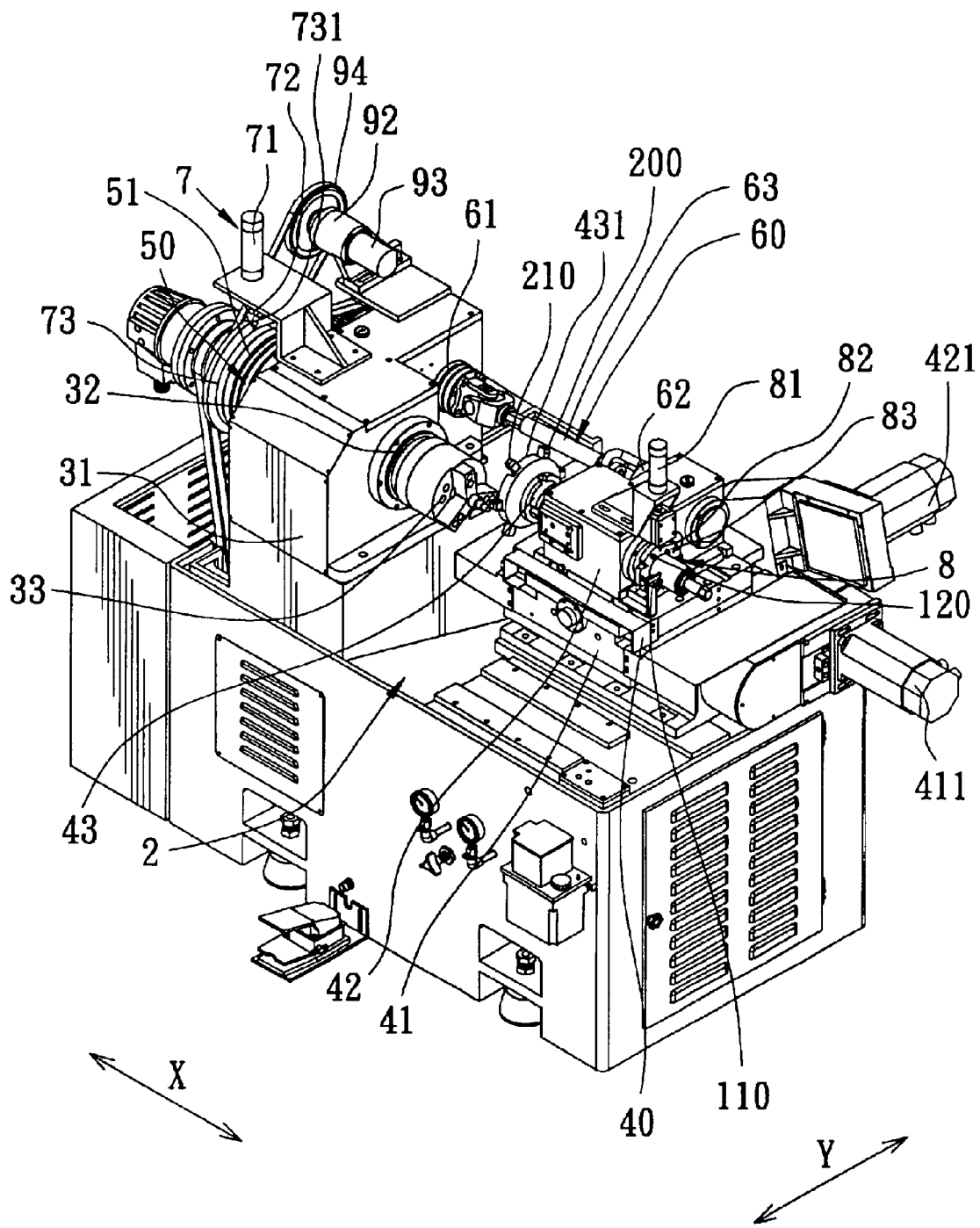
FIG. 2 is a perspective view of a turret lathe embodying this invention.
Figure 3:
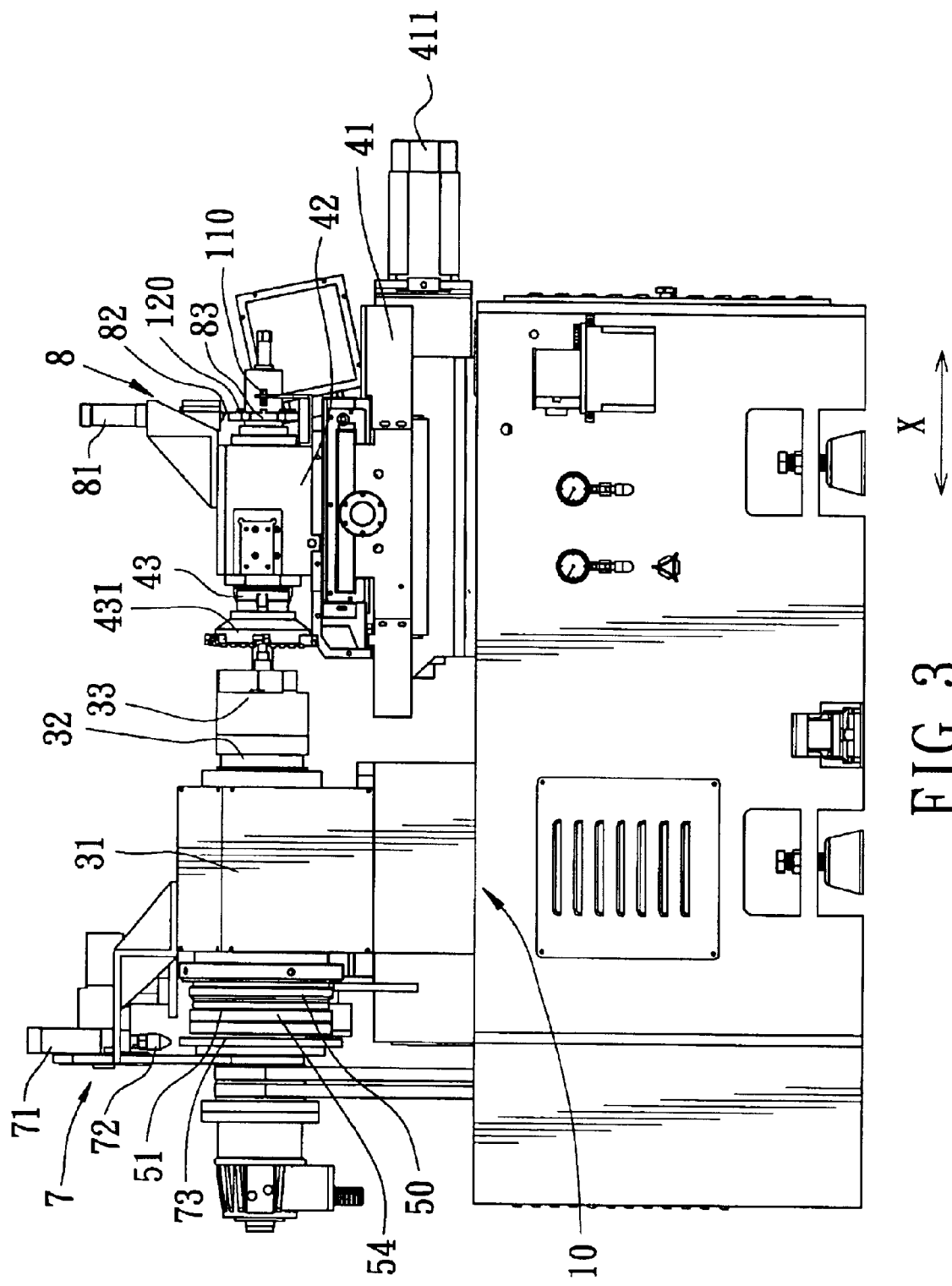
FIG. 3 is a side view of the turret lathe of FIG. 2.
Figure 4:
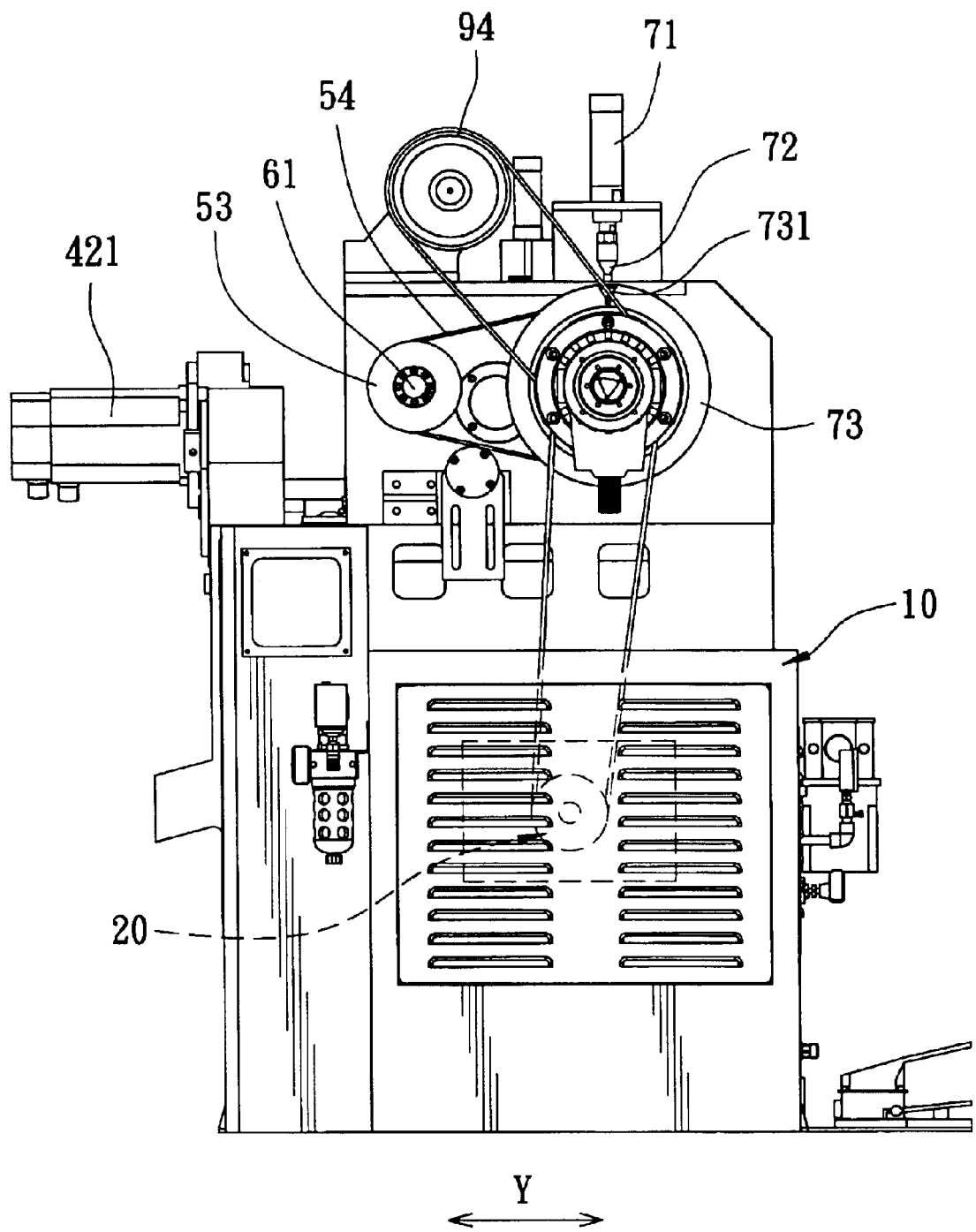
FIG. 4 is another side view of the turret lathe of FIG. 2.
Figure 7:
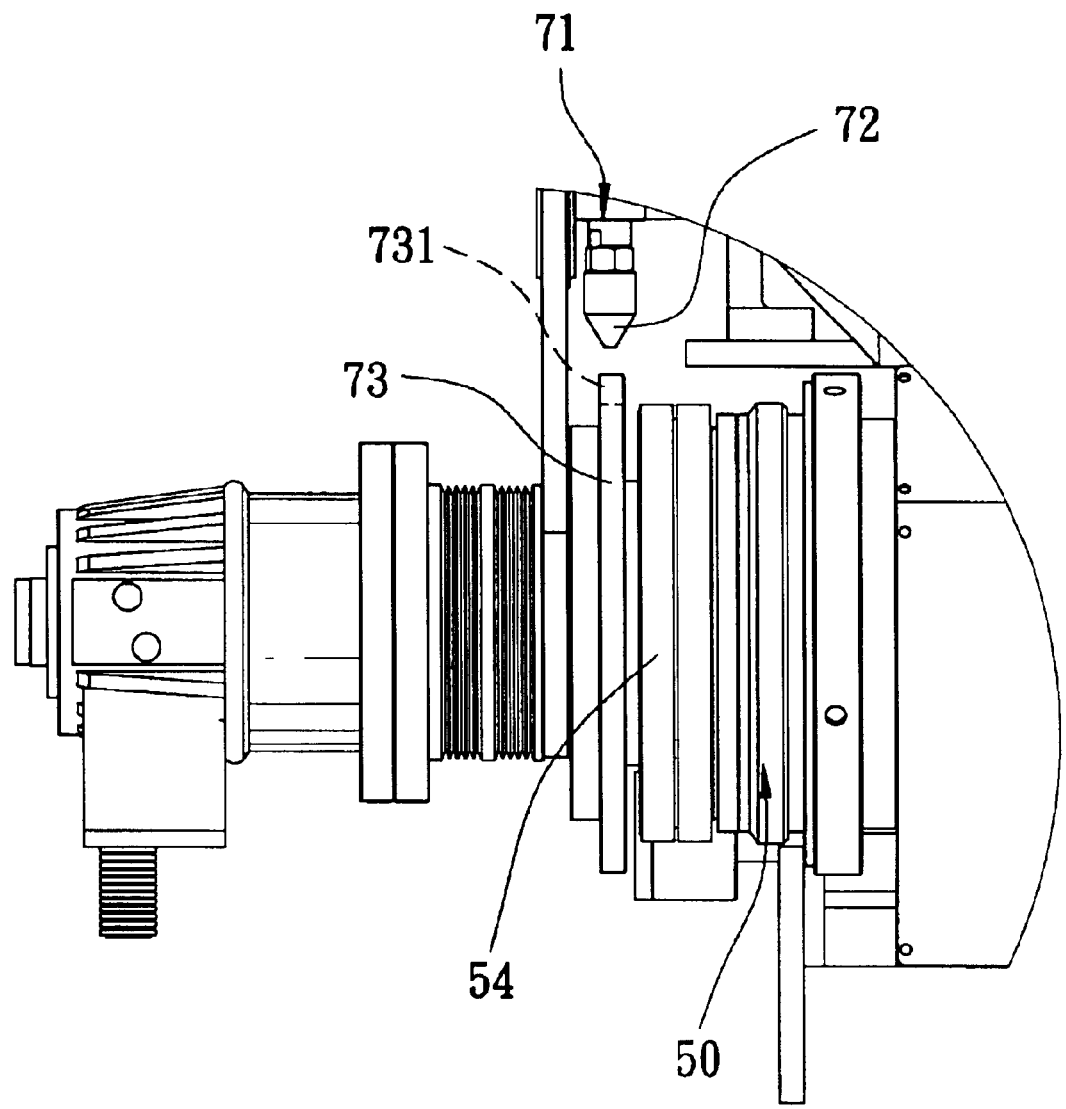
FIGS. 7 and 8 are fragmentary views to illustrate how a first piston-and-cylinder assembly is operated between a first disengaging position and a first engaging position.
Figure 8:
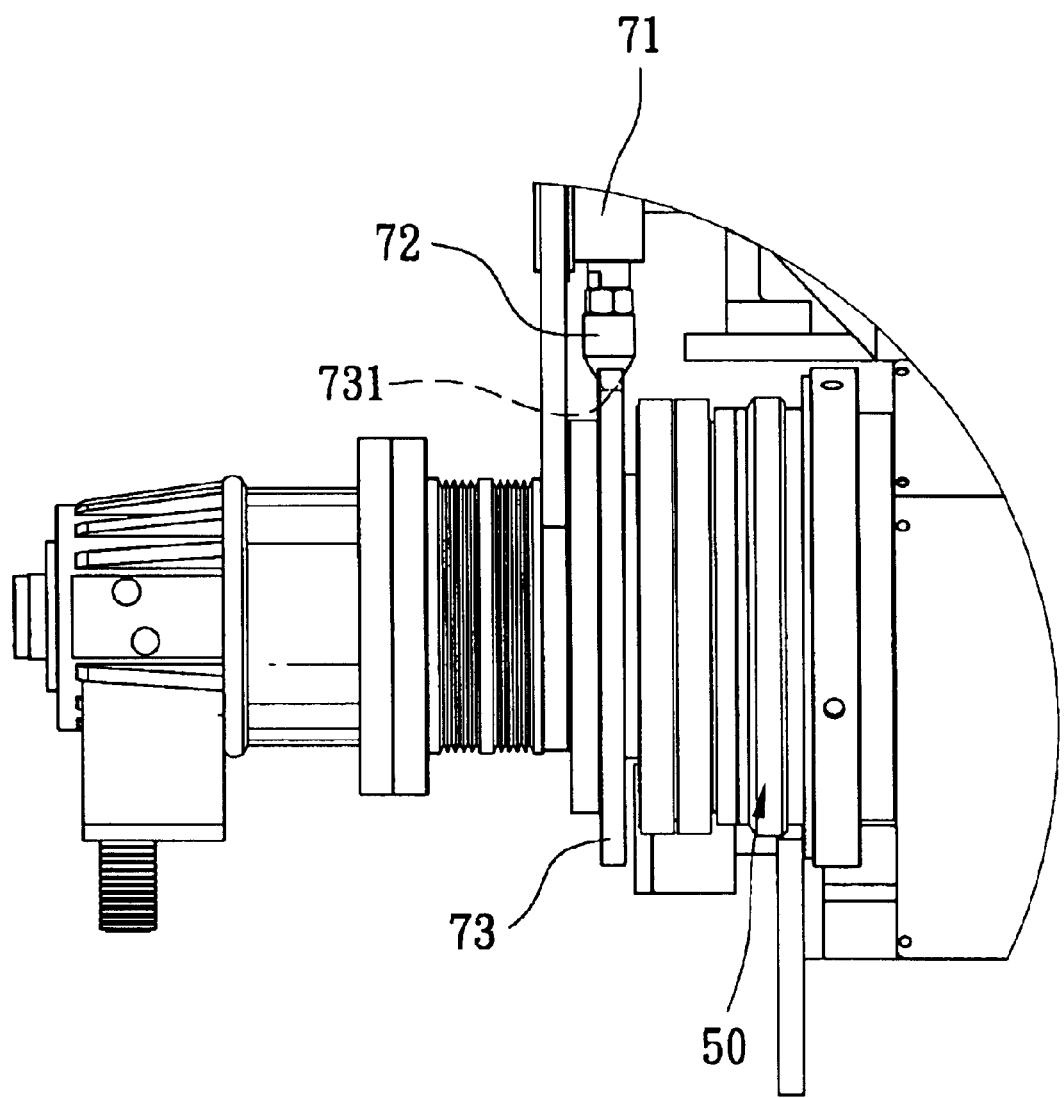

Referring to FIGS. 7 and 8, in combination with FIGS. 2 to 4, a first locking unit 7 includes a first piston-and-cylinder assembly 71 that is mounted on the headstock 31 and that includes a first piston having an engaging end 72, a first locking disc 73 that is connected to the first pulley 51 and that is formed with an engaging groove 731, a second driving unit 93 which includes a motor connected to the first locking disc 73 through a belt-and-pulley unit 94, and a sensor 92 that detects an angular position of the first locking disc 73 and that is electrically connected to the second driving unit 93 so as to actuate the second driving unit 93 to rotate the first locking disc 73 to a position, in which the engaging groove 731 in the first locking disc 73 is aligned with the engaging end 72 of the first piston. The first piston-and-cylinder assembly 71 is operable between a first engaging position (see FIG. 8), in which the engaging end 72 of the first piston extends into and engages the engaging groove 731 in the first locking disc 73 when the clutch 50 is operated at the turning operation mode, thereby preventing undesired rotation of the first pulley 51 by virtue of the clutch 50 upon rotation of the spindle 32, and a first disengaging position (see FIG. 7), in which the engaging end 72 of the first piston disengages from the engaging groove 731 in the first locking disc 73 when the clutch 50 is operated at the chamfering operation mode.

Figure 9:
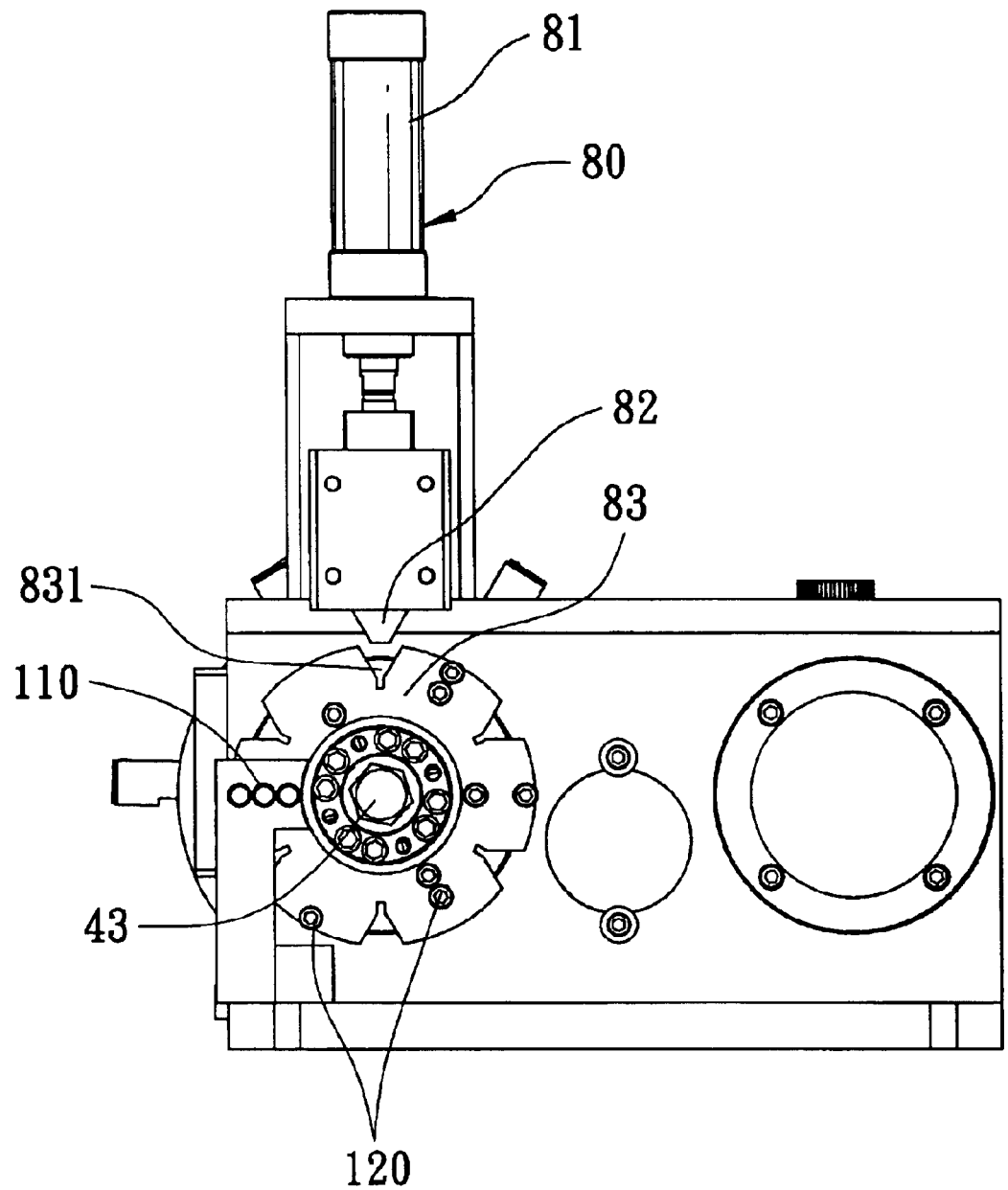
FIGS. 9 and 10 are fragmentary views to illustrate how a second piston-and-cylinder assembly is operated between a second disengaging position and a second engaging position.
Figure 10:
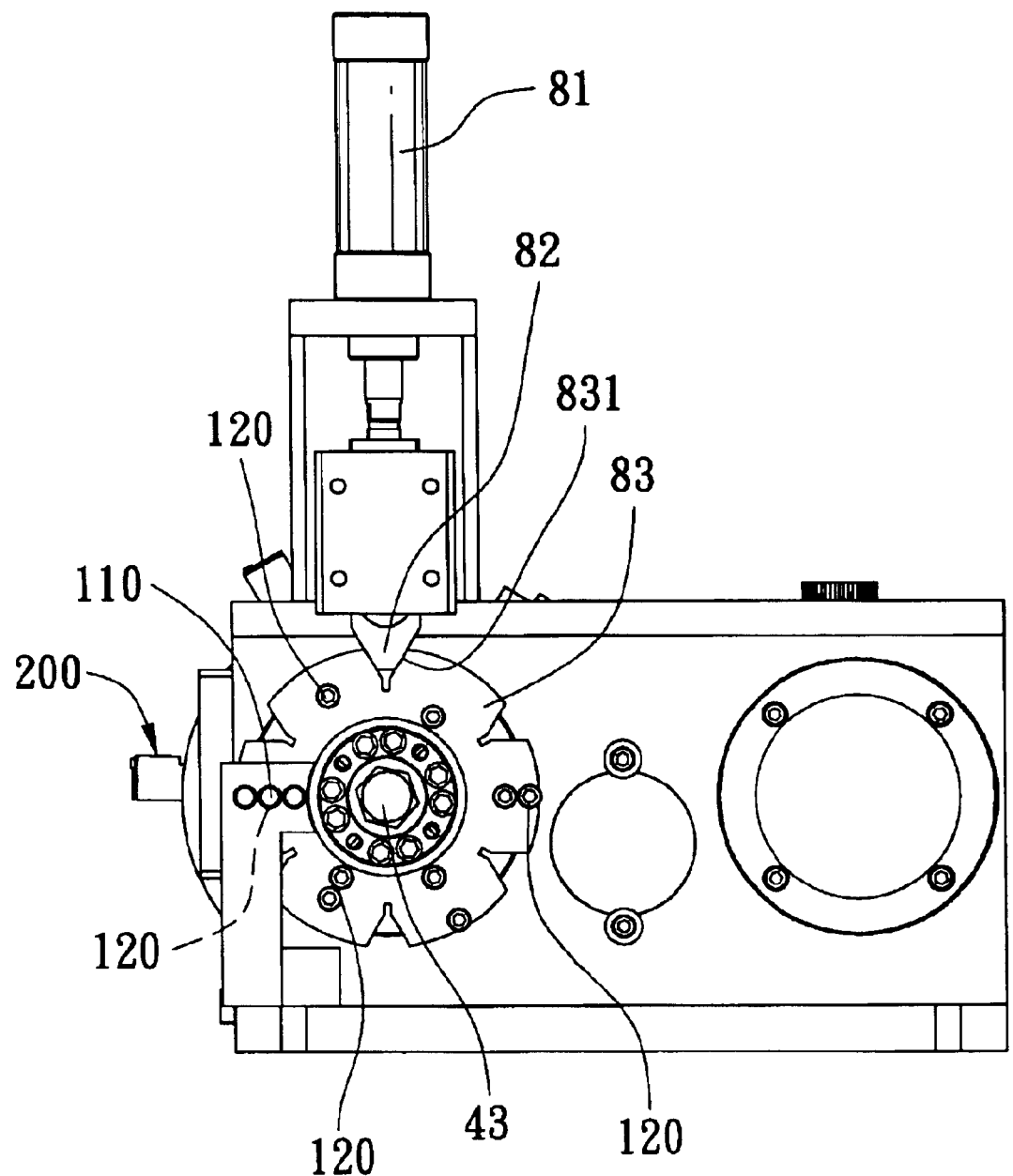

Referring to FIGS. 9 and 10, in combination with FIGS. 2 to 4, a second locking unit 8 includes a second piston-and-cylinder assembly 81 that is mounted on the tailstock 42 and that includes a second piston having an engaging end 82, and a second locking disc 83 that is co-axially mounted on the driven shaft 43 and that is formed with a plurality of engaging grooves 831 which are adapted to be respectively aligned with the turning tools 200 in the longitudinal direction (X). The second piston-and-cylinder assembly 81 is operable between a second engaging position (see FIG. 10), in which the engaging end 82 of the second piston extends into and engages a selected one of the engaging grooves 831 in the second locking disc 83 when the clutch 50 is operated at the turning operation mode, thereby preventing rotation of the driven shaft 43 during a cutting operation, and a second disengaging position (see FIG. 9), in which the engaging end 82 of the second piston disengages from the selected one of the engaging grooves 831 in the second locking disc 83 when the clutch 50 is operated at the chamfering operation mode. The second locking disc 83 is provided with a plurality of angularly spaced apart sensors 120 that respectively correspond to angular positions of the turning tools 200. A detector 110 is mounted on the second slide 40, and confronts the second locking disc 83 so as to detect the angular positions of the turning tools 200 through the sensors 120 and so as to permit adjustment of the turret 431 to a desired angular position, in which a selected one of the turning tools 200 contacts the workpiece during the turning operation.

Since the chamfer tools 210 and the turning tools 200 are mounted on the turret 341 on the tailstock 42 of the turret lathe of this invention, the aforesaid drawbacks associated with the conventional turret lathe can be eliminated.

With the invention thus explained, it is apparent that various modifications and variations can be made without departing from the spirit of the present invention. It is therefore intended that the invention be limited only as recited in the appended claims.

I claim:

1. A turret lathe comprising:

a bed having two opposite ends;

a headstock mounted on one of said opposite ends of said bed;

a driving unit mounted on said bed;

a spindle journalled to said headstock and driven by said driving unit to rotate about a rotation axis;

a chuck mounted on said spindle;

a first slide mounted slidably on the other of said opposite ends of said bed and slidable toward and away from said chuck in a longitudinal direction parallel to said rotation axis;

a second slide mounted slidably on said first slide and slidable toward and away from said rotation axis in a transverse direction relative to said longitudinal direction;

a tailstock mounted on said second slide;

a driven shaft journalled to said tailstock;

a turret mounted on said driven shaft so as to co-rotate therewith, disposed between said chuck and said tailstock, and adapted to permit mounting of a plurality of tools thereon;

a transmission unit associated with said spindle and said driven shaft; and a clutch that is associated with said transmission unit and said spindle and that is operable between a chamfering operation mode, in which said transmission unit interconnects said spindle and said driven shaft through said clutch, thereby permitting co-rotation of said spindle and said driven shaft, and a turning operation mode, in which said spindle is disconnected from said driven shaft, thereby avoiding rotation of said driven shaft when said spindle rotates.

2. The turret lathe of claim 1, wherein said transmission unit includes a first pulley that is associated with said clutch, an input shaft that is journalled to said headstock and that is parallel to said rotation axis, a second pulley that is co-axially mounted on said input shaft, a belt that is trained on said first and second pulleys, first and second universal joints, an output shaft that is journalled to said tailstock, that is parallel to said rotation axis, and that is connected to said driven shaft, and a telescopic connecting member that is disposed between and that interconnects said input and output shafts through said first and second universal joints and that is telescopically extendable in said longitudinal direction, said first pulley being connected to said spindle through said clutch when said clutch is operated at said chamfering operation mode, and being disconnected from said spindle when said clutch is operated at said turning operation mode.

3. The turret lathe of claim 2, further comprising a first locking unit including a first piston-and-cylinder assembly that is mounted on said headstock and that includes a first piston having an engaging end, a first locking disc that is connected to said first pulley and that is formed with an engaging groove, a second driving unit connected to said first locking disc, and a sensor that detects an angular position of said first locking disc and that is electrically connected to said second driving unit so as to actuate said second driving unit to rotate said first locking disc to a position, in which said engaging groove in said first locking disc is aligned with said engaging end of said first piston, said first piston-and-cylinder assembly being operable between a first engaging position, in which said engaging end of said first piston extends into and engages said engaging groove in said first locking disc when said clutch is operated at said turning operation mode, thereby preventing undesired rotation of said first pulley by virtue of said clutch upon rotation of said spindle, and a first disengaging position, in which said engaging end of said first piston disengages from said engaging groove in said first locking disc when said clutch is operated at said chamfering operation mode.

4. The turret lathe of claim 3, further comprising a second locking unit including a second piston-and-cylinder assembly that is mounted on said tailstock and that includes a second piston having an engaging end, and a second locking disc that is co-axially mounted on said driven shaft and that is formed with a plurality of engaging grooves which are adapted to be respectively aligned with the tools in said longitudinal direction, said second piston-and-cylinder assembly being operable between a second engaging position, in which said engaging end of said second piston extends into and engages a selected one of said engaging grooves in said second locking disc when said clutch is operated at said turning operation mode, thereby preventing rotation of said driven shaft during a cutting operation, and a second disengaging position, in which said engaging end of said second piston disengages from the selected one of said engaging grooves in said second locking disc when said clutch is operated at said chamfering operation mode.

* * * * *